(No Model.)
F. G. KELLOGG.
LUBRICATOR GLAND.
No. 476,747. Patented June 7, 1892.
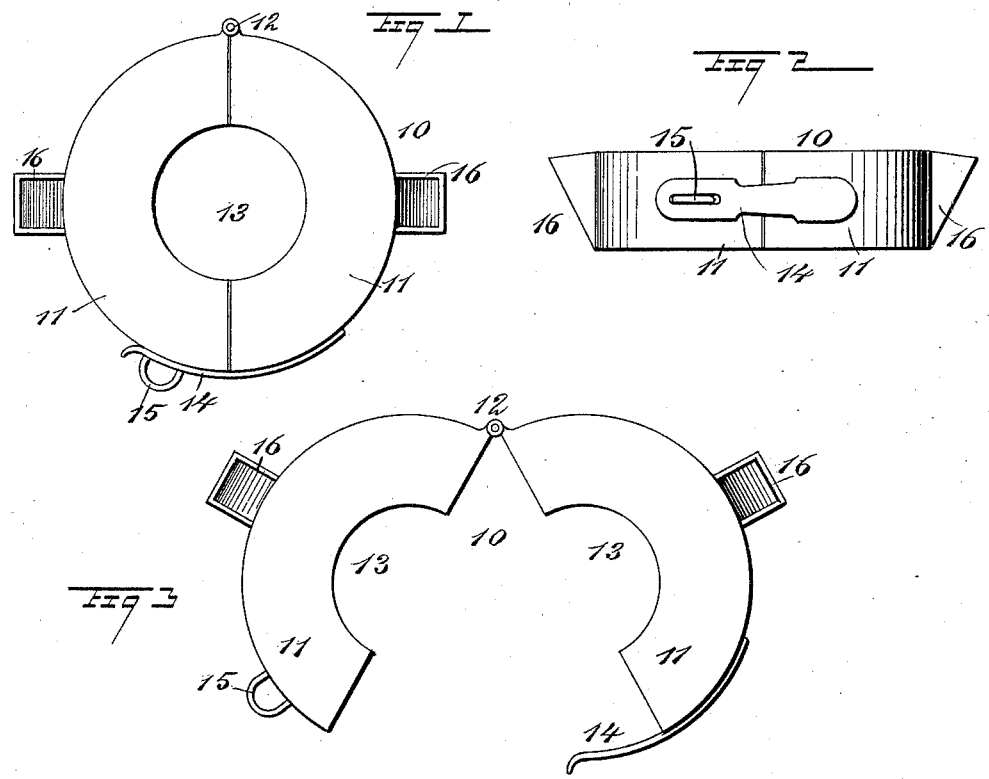
WITNESSES:
H. Walker
C. Sedgwick
INVENTOR
F. G. Kellogg
BY Munn & Co.
ATTORNEYS.

UNITED STATES PATENT OFFICE.

FORTUNATUS G. KELLOGG, OF BRAINERD, MINNESOTA, ASSIGNOR OF ONE HALF TO HENRY FOX, OF SAME PLACE.

LUBRICATOR-GLAND.

SPECIFICATION forming part of Letters Patent No. 476,747, dated June 7, 1892.

Application filed August 5, 1891. Serial No. 401,745. (No model.)

*To all whom it may concern:*

Be it known that I, FORTUNATUS G. KELLOGG, of Brainerd, in the county of Crow Wing and State of Minnesota, have invented a new and Improved Lubricator-Gland, of which the following is a full, clear, and exact description.

My invention relates to improvements in glands; and the object of my invention is to produce a gland which may be conveniently applied to reciprocating shafts—such, for instance, as the piston-rods and valve-stems of steam-engines—and which will hold a gland in position upon the shafts, so as to keep the same well lubricated.

To this end my invention consists in a gland constructed substantially as hereinafter described and claimed.

Reference is to be had to the accompanying drawings, forming a part of this specification, in which similar figures of reference indicate corresponding parts in all the views.

Figure 1 is a plan view of a gland embodying my invention and adapted for use on vertically-reciprocating shafts. Fig. 2 is a side elevation of the same. Fig. 3 is a detail view showing the gland partially open.

The gland 10, which is preferably of a cylindrical shape, is composed of two sections 11, which are hinged together, as shown at 12, and which are adapted to contain the packing 12ª, which packing is intended to absorb the oil injected into the box and deliver it in necessary quantities upon the shaft. The gland has a central opening 13 therein, through which extends the shaft to which the gland is applied. The parts 11 of the gland are secured together on the side opposite the hinge by means of a spring-latch 14, which is secured to one section, and a staple 15, which is secured to the opposite section and is adapted to engage the latch. On opposite sides of the gland 10 are funnels 16, there being one on each section 11, which funnels communicate with the interior of the gland, and by filling them with oil the latter will enter the gland and permeate the packing.

The operation of the device is obvious. The gland shown is clasped upon the shaft and fastened in place, and as the shaft reciprocates the oiled packing held in the gland will transfer just the amount of oil necessary to the shaft, and the gland will serve to prevent oil from flowing upon anything except the shaft.

Having thus fully described my invention, I claim as new and desire to secure by Letters Patent—

As an improved article of manufacture, the lubricator-gland consisting in a box 10, composed of the two sections 11, hinged together at 12 and provided opposite their place of hinging with a staple 15 and hasp 14 and a peripheral funnel 16 on each section, the adjacent or meeting sides of the two sections having registering semicircular openings forming the shaft-passage 13, substantially as set forth.

FORTUNATUS G. KELLOGG.

Witnesses:
HARRY FOX,
W. H. MANTOR.